(12) United States Patent
Nitta et al.

(10) Patent No.: US 6,265,804 B1
(45) Date of Patent: *Jul. 24, 2001

(54) ELECTRIC MOTOR WITH SPLIT STATOR CORE AND METHOD OF MAKING THE SAME

(75) Inventors: Isamu Nitta, Yokahama; Kinya Hayashi, Toki, both of (JP)

(73) Assignee: Kabushiki Kaisha Toshiba, Kanagawa (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/391,450

(22) Filed: Sep. 8, 1999

(30) Foreign Application Priority Data

| Sep. 8, 1998 | (JP) | 10-253716 |
| Dec. 22, 1998 | (JP) | 10-364401 |
| Aug. 17, 1999 | (JP) | 11-230540 |

(51) Int. Cl.[7] ............... H02K 1/12; H02K 1/06; H02K 1/00; H02K 1/04
(52) U.S. Cl. ............ 310/259; 310/217; 310/193; 310/43
(58) Field of Search .................. 310/269, 254, 310/258, 259, 216, 217, 218, 179, 185, 193, 43, 45; 29/596

(56) References Cited

U.S. PATENT DOCUMENTS

| 4,015,154 | * | 3/1977 | Tanaka et al. | 310/42 |
| 4,365,180 | * | 12/1982 | Licata et al. | 310/216 |
| 4,665,329 | * | 5/1987 | Raschbichler | 310/13 |
| 4,672,253 | * | 6/1987 | Tajima et al. | 310/269 |
| 4,818,911 | * | 4/1989 | Taguchi et al. | 310/259 |
| 4,990,809 | * | 2/1991 | Artus et al. | 310/192 |
| 5,592,731 | * | 1/1997 | Huang et al. | 29/596 |
| 5,739,614 | * | 4/1998 | Suzuki et al. | 310/180 |
| 5,859,486 | * | 1/1999 | Nakahara et al. | 310/254 |
| 5,912,515 | * | 6/1999 | Ackermann et al. | 310/67 R |

FOREIGN PATENT DOCUMENTS 4-29536    1/1992   (JP) .

* cited by examiner

Primary Examiner—Elvin Enad
Assistant Examiner—Dang Dinh Le
(74) Attorney, Agent, or Firm—Pillsbury Winthrop LLP

(57) ABSTRACT

An electric motor includes a rotor and a stator including a plurality of unit cores each of which has two ends. The unit cores are disposed so that the ends of each unit core are adjacent to the ends of the neighboring unit cores respectively. Each unit core includes a yoke section and a plurality of salient poles which are integral with the yoke section and on which windings are wound respectively. Adjacent portions of the unit cores are selected so that magnetic fluxes passing through the respective adjacent portions are substantially the same.

12 Claims, 14 Drawing Sheets

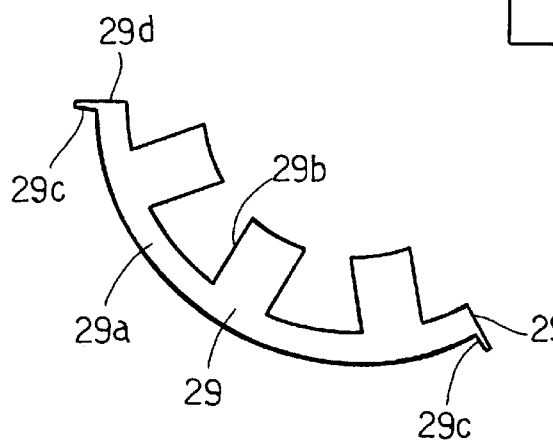
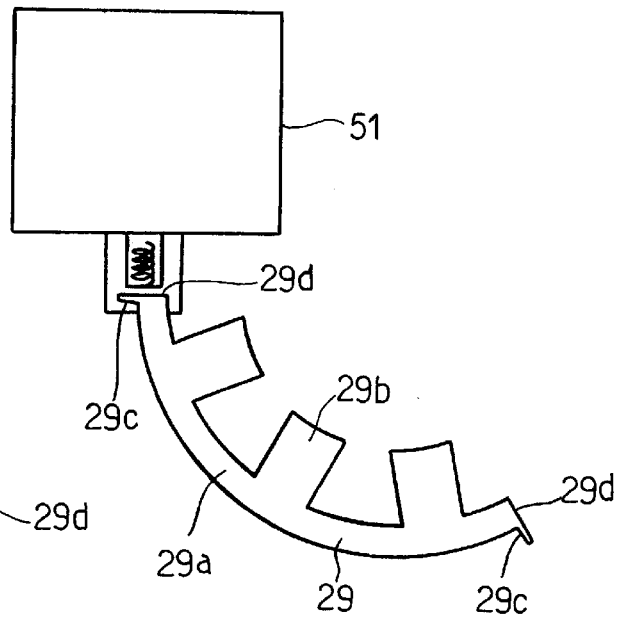
FIG. 12  FIG. 13
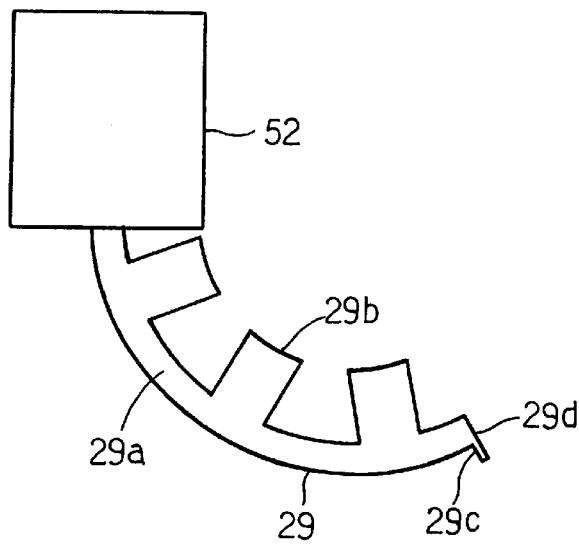
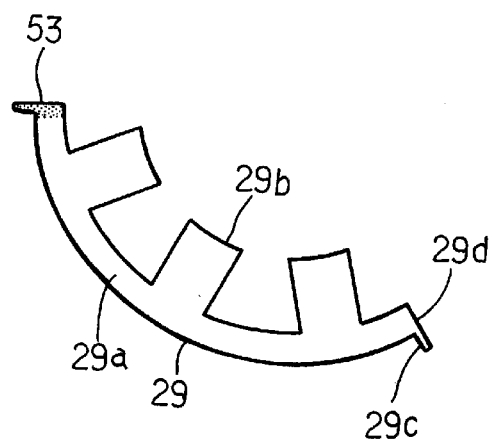
FIG. 14  FIG. 15

ELECTRIC MOTOR WITH SPLIT STATOR CORE AND METHOD OF MAKING THE SAME

BACKGROUND OF THE INVENTION

1. Field of the Invention

This invention relates to an electric motor provided with a split stator core including a plurality of circumferentially disposed unit cores and a method of making such a motor.

2. Description of the Prior Art

For the purpose of effective utilization of steel material, the prior art has provided an annular split stator core formed by disposing a plurality of circumferentially split unit cores into a generally circularly or squarely annular configuration. More specifically, when annular steel sheets which are to be stacked into a stator core are punched out of steel sheets, portions of each steel sheet outside and inside the annular configuration are left unused. The above-mentioned annular split stator core provided by the prior art is directed to a reduction in such unused portions of the steel sheets.

However, a location of portions of the unit cores adjacent to each other is selected at random. This results in unbalance in magnetic attractive forces acting between the unit cores, whereupon vibration and noise are produced.

Each of a number of steel sheets stacked together into a unit core is formed by punching a silicon steel sheet having a surface treated for electrical insulation by a press. The punching sometimes results in warpage and/or burrs in ends of the silicon steel sheet. In a stator core formed by annularly disposing a plurality of unit cores, when the unit cores adjacent to each other are displaced in the direction of stack of the steel sheets or when one or more steel sheets have the warpage and/or burrs, the steel sheets of each unit core are electrically short-circuited by the ends of the steel sheets of the other unit core. This results in eddy currents flowing in the direction of stack of steel sheets in the unit core, so that an iron loss is increased.

SUMMARY OF THE INVENTION

Therefore, an object of the present invention is to provide an electric motor in which the unbalance in the magnetic attractive forces acting between the unit cores can be restrained so that the vibration and noise are prevented, and a method of making the motor.

Another object is to provide an electric motor which is provided with a stator core including a plurality of unit cores and in which the iron loss can be reduced.

The present invention provides an electric motor comprising a rotor and a stator including a plurality of unit cores each of which has two ends. The unit cores are disposed so that the ends of each unit core are adjacent to the ends of the neighboring unit cores respectively. Each unit core includes a yoke section and a plurality of salient poles which are integral with the yoke section and on which concentrated windings are wound. In this construction, each unit core is disposed so that the yoke section thereof is adjacent to the yoke sections of the neighboring unit cores and so that the salient poles thereof are separate from the salient poles of the neighboring unit cores. Further, the salient poles are arranged circumferentially with a regular pitch. Further, a number of the salient poles of each unit core is equal to a number of phases of the windings multiplied by any integer. Additionally, each of the portions of the unit cores adjacent to each other is set so as to assume an angular position where a multiple obtained by multiplying a pitch angle of the salient poles agrees with a multiple obtained by multiplying a pitch angle of magnetic poles of the rotor.

Upon excitation of the windings of the above-described motor, a rotating magnetic field is generated so that the rotor is rotated. An amount of magnetic flux passing through each yoke section changes momentarily as the rotor is rotated. However, when a plurality of salient poles are provided so as to correspond to each of the phases, the yoke sections of the stator core have at an interval of a predetermined angle portions where amounts of magnetic flux passing therethrough become the same. In the present invention, the number of salient poles of each unit core is determined so that the interval of the predetermined angle coincides with the adjacent portions of the unit cores. Accordingly, the amounts of magnetic flux passing through the respective adjacent portions of the unit cores become approximately the same although changing momentarily. Consequently, when the adjacent portions of the unit cores are located so as to correspond to positions where the magnetic fluxes passing the respective yoke sections are substantially the same, the magnetic attractive forces acting between the unit cores can be balanced to be canceled, whereupon occurrence of the vibration and noise due to the magnetic attractive forces can be prevented.

Each unit core preferably includes the salient poles the number of which is represented as $CM(Nt/CD(Nt, Np), Nf)$ where $CM(A, B)$ is a common multiple of integers A and B, $CD(A, B)$ is a common divisor of integers A and B, $Nt$ is a total number of salient poles of a stator, which is equal to or larger than 2, $Np$ is a total number of magnetic poles of a rotor, which is equal to or larger than 2, and $Nf$ is the number of winding phases.

In a case where the positions where the magnetic fluxes passing through the yoke sections are substantially the same are obtained when a rotor used With the above-described stator has a plurality of magnetic poles, a total number of magnetic poles of the rotor is preferably equal to the number of unit cores multiplied by any positive number, in addition to the condition that the number of salient poles of each unit core is equal to the number of winding phases multiplied by any positive integer.

The number of unit cores is obtained when a divisor common to the above-mentioned total numbers $Nt$ and $Np$ is found. Accordingly, when the total number $Np$ is divided by the number of unit cores, the least number of salient poles that can be provided on a single unit core is obtained. Accordingly, the number of salient poles of each unit core can be obtained from a multiple common to the least number of salient poles and the total number $Nf$ of winding phases.

The salient poles preferably have different shapes of distal ends and arranged in a pattern in which said salient poles having the different shapes of distal ends adjoin each other, the pattern being repeated circumferentially. The number of the salient poles of each unit core is equal to a common multiple to a number of the distal end shapes of the salient poles and the number of winding phases.

In the above-described arrangement pattern of the salient poles, the arrangement pattern of salient poles of each unit core needs to correspond to those in the adjacent unit cores in addition to the condition that the number of salient poles of each unit core is equal to the number of winding phases multiplied by any positive integer. This is met when the number of salient poles is a common multiple to the number of types of distal ends of the salient poles and the number of winding phases. In this case, the multiple is preferably a least common multiple.

The invention also provides an electric motor comprising a rotor and a stator core including a plurality of unit cores each of which has two ends. The unit cores are disposed so that the ends of each unit core are adjacent to the ends of the neighboring unit cores with electrically insulating clearance maintaining members being interposed therebetween, respectively. Each unit core is formed by stacking a number of steel sheets each of which has a surface to which a treatment for electrical insulation is applied. Since the ends of the adjacently disposed unit cores are separated from each other by the clearance maintaining members, the ends can be insulated from each other such that eddy current loss is reduced.

In a preferred form, the clearance between the ends of each unit core and the neighboring unit cores is set to be in a range between 0.01 and 0.15 mm.

BRIEF DESCRIPTION OF THE DRAWINGS

Other objects, features and advantages of the present invention will become clear upon reviewing the following description of the preferred embodiments, made with reference to the accompanying drawings, in which:

FIGS. 12 to 15 are plan views of an electric motor of a sixth embodiment in accordance with the invention, showing the steps of making the motor;

DETAILED DESCRIPTION OF THE PREFERRED EMBODIMENTS

Figure 1:
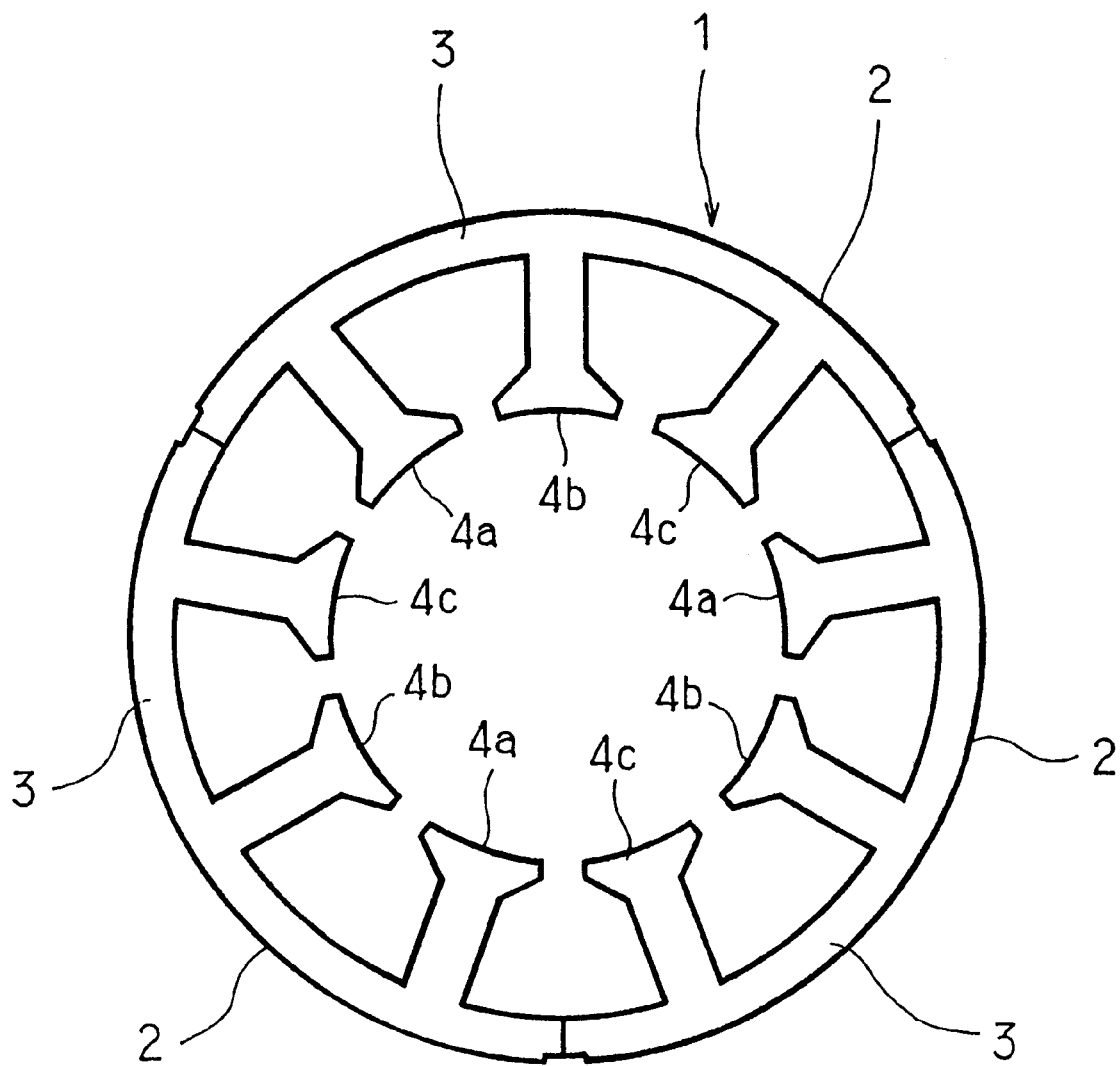
FIG. 1 is a plan view of a stator core of an electric motor of a first embodiment in accordance with the present invention.

A first embodiment of the invention will be described with reference to FIG. 1. The invention is applied to an electric motor of the inner rotor type in which a rotor is disposed inside a stator. Referring to FIG. 1, a split stator core 1 of the motor is shown. The split stator core 1 comprises three unit cores 2. Each unit core 2 is made by stacking a number of punched silicon steel sheets. Outer circumferential faces of ends of each unit core 2 adjacent to ends of the other unit cores 2 are welded together to be connected to each other. As a result, each end of each unit core is adjacent to one of the ends of the neighboring unit core with a minute clearance therebetween.

Each unit core 2 includes a yoke section 3 and three salient poles 4a to 4c extending from the yoke section 3. Windings are wound on the salient poles 4a to 4c of each unit core 2 into a concentric winding (not shown) so that the salient poles 4a to 4c are in phase with those of the other unit cores 2 respectively. More specifically, windings of phase a are wound on the three salient poles 4a respectively and windings of phase b are wound on the three salient poles 4b respectively. Further, windings of phase c are wound on the three salient poles 4c respectively. Thus, three-phase windings are wound on the stator core 1 and the number of salient poles and the number of winding phases are equal to each other in each unit core 2.

In the stator core 1 constructed as described above, each of portions of each unit core 2 adjacent to the respective neighboring unit cores 2 is located between the salient poles 4a and 4c or between phase a and c windings. In other words, winding phase arrangement patterns at both sides of all the adjacent portions are the same.

In the above-described stator core 1, the yoke sections 3 where amounts of magnetic flux passing through them are substantially the same exist at an interval of a predetermined angle when the windings of the respective phases are wound on the salient poles 4a to 4c. The interval is represented as a pitch angle of salient poles, the number of which is obtained by multiplying the number of winding phases by a positive number. Accordingly, when the stator core 1 is constructed as described above, the number of winding phases is 3, and the number of salient poles of each unit core 2 is 3 and is equal to the number of winding phases multiplied by any positive number (1 in the embodiment). Consequently, the stator core 1 is split so that amounts of magnetic flux passing through the adjacent portions become the same. A rotor (not shown) is provided inside the stator core 1 so that the motor is constructed.

According to the above-described embodiment, the adjacent portions of the unit cores 2 are positioned at intervals of the number of salient poles which is obtained by multiplying the number of winding phases by a positive number. Consequently, since magnetic attractive forces acting between the unit cores 2 constituting the stator core 1 are approximately equal to each other, occurrence of vibration and noise due to unbalance of the magnetic attractive forces between the unit cores 2 can be prevented.

The above-mentioned positive number in 1 in the embodiment and consequently, the stator core can be divided into the largest number of unit cores 2. Accordingly, the material for the iron core can effectively be used. Further, since only the locations of the adjacent portions of the unit cores 2 need to be determined when the invention is to be put into practice, the invention can be realized without an increase in the manufacturing cost.

Figure 2:
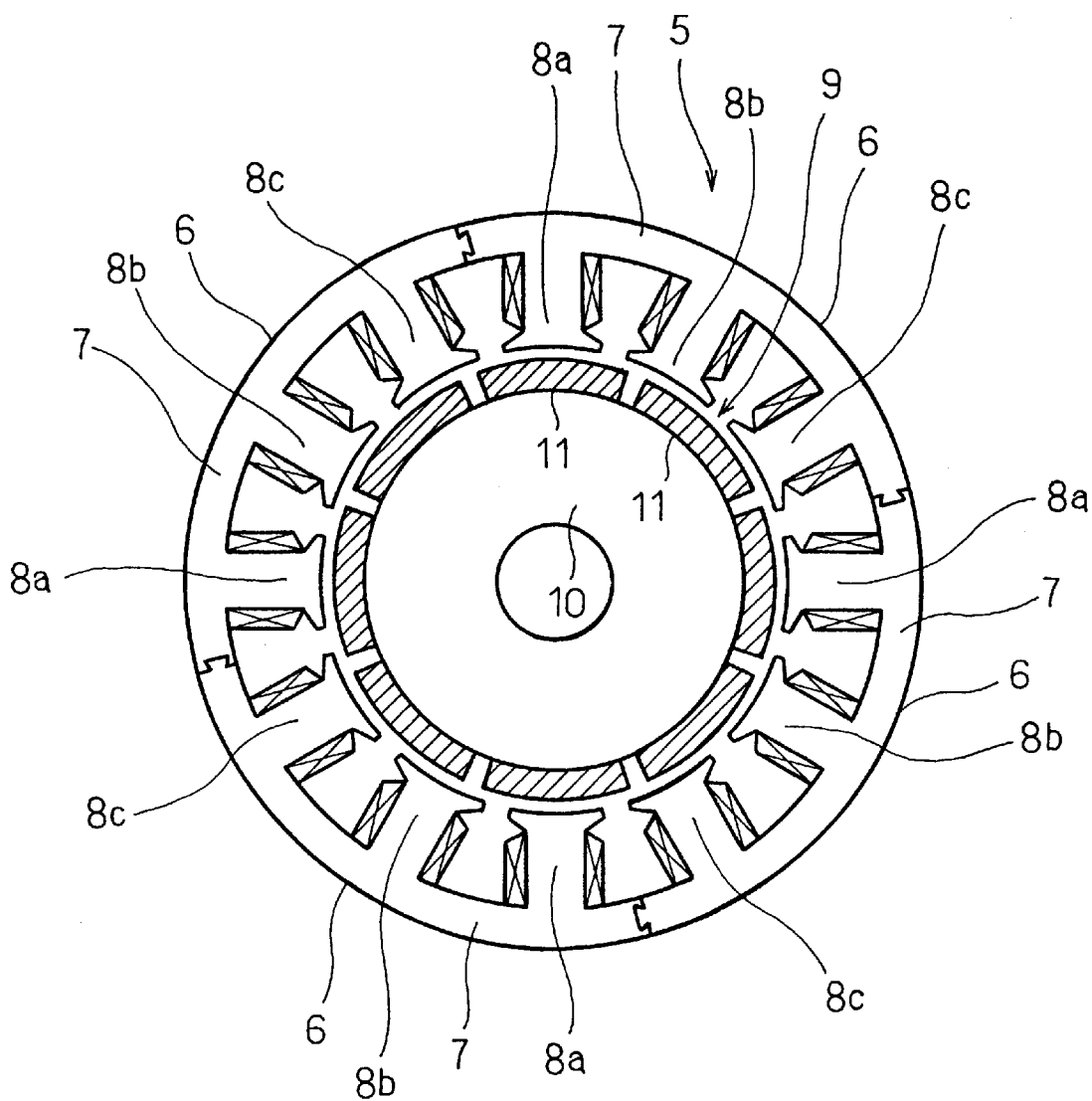
FIG. 2 is a plan view of a stator core and a rotor of an electric motor of a second embodiment in accordance with the invention.

FIG. 2 illustrates a second embodiment in which the invention is applied to a permanent magnet motor of the inner rotor type. The stator core 5 comprises four unit cores 6. Each unit core 6 includes a yoke section 7 and three salient poles 8a to 8c extending from the yoke section. Windings are wound on the salient poles 8a to 8c of each unit core 6 into a concentric winding (not shown) so that the salient poles 8a to 8c are in phase with those of the other unit cores 6 respectively. More specifically, three-phase windings are wound on the stator core 5 and the number of salient poles and the number of winding phases are equal to each other in each unit core 6.

A rotor 9 comprises a yoke 10 serving as a magnetic path and eight permanent magnets 11 mounted on an outer circumferential face of the yoke 10. A total number of magnetic poles of the rotor 9 is 8 and the number of unit cores 6 of the stator core 5 is 4. Accordingly, the total number of magnetic poles of the rotor 9 in exactly divisible by the number of unit cores 6 of the stator core 5. Further, the number of magnetic poles opposed to each one of the unit cores 5 is 2.

Each of the adjacent portions of each unit core 6 and each neighboring unit core 6 is formed into the shape of a dovetail and is located between the salient poles 8a and 8c. Further, winding phase arrangement patterns at both sides of all the adjacent portions are the same. Moreover, patterns of opposition between the salient poles and the permanent magnets at all the adjacent portions of the unit cores 6 are also the same. The reason for this is that the salient poles 8a to 8c are opposed to a magnetic pole 11 of the rotor 9 at the same position represented by an electrical angle. This means that the iron core is split so that amounts of magnetic flux passing through the adjacent portions become the same.

In order that amounts of magnetic flux passing through the adjacent portions may become the same, the number of salient poles per unit core is represented as CM(Nt/CD(Nt, Np), Nf) where CM(A, B) is a common multiple of integers A and B, CD(A, B) is a common divisor of integers A and B, Nt is a total number of salient poles of a stator, which is equal to or larger than 2, Np is a total number of magnetic poles of a rotor, which is equal to or larger than 2, and Nf is the number of winding phases.

More specifically, in a case where the positions where the magnetic fluxes passing through the respective yoke sections are substantially equal to each other are obtained when a rotor used with the above-described stator has a plurality of magnetic poles, the total number of magnetic poles of the rotor 9 is required to be equal to the number of unit cores multiplied by any positive number, in addition to the condition that the number of salient poles of each unit core 6 is equal to the number of winding phases multiplied by any positive integer.

The number of unit cores is obtained when a divisor common to the above-mentioned total numbers Nt and Np is found. Accordingly, when the total number Np is divided by the number of unit cores, the least number of salient poles that can be provided on a single unit core is obtained. Accordingly, the number of salient poles of each unit core can be obtained from a common multiple to the least number of salient poles and the total number Nf of winding phases.

According to the second embodiment, in the permanent magnet motor of the inner rotor type, the adjacent portion between each unit core 6 and each neighboring one is located so that the total number of magnetic poles of the rotor 9 is divided out by the number of unit cores 6 of the stator core 5 and so that the winding phase arrangement patterns at both sides of all the adjacent portions are the same. Even when the magnetic attractive forces act between the unit cores 6 constituting the stator core 5, the forces are approximately equal to each other. Consequently, occurrence of vibration and noise due to unbalance of the magnetic attractive forces between the unit cores 6 can be prevented.

Further, in the case where the least common multiple is found when a common multiple to the least number of salient poles and the total number Nf of winding phases is obtained, the least number of salient poles of each unit core is obtained. Since this means that the stator core can be split into the largest number of unit cores 6, the material for the iron core can effectively be used.

Figure 3:
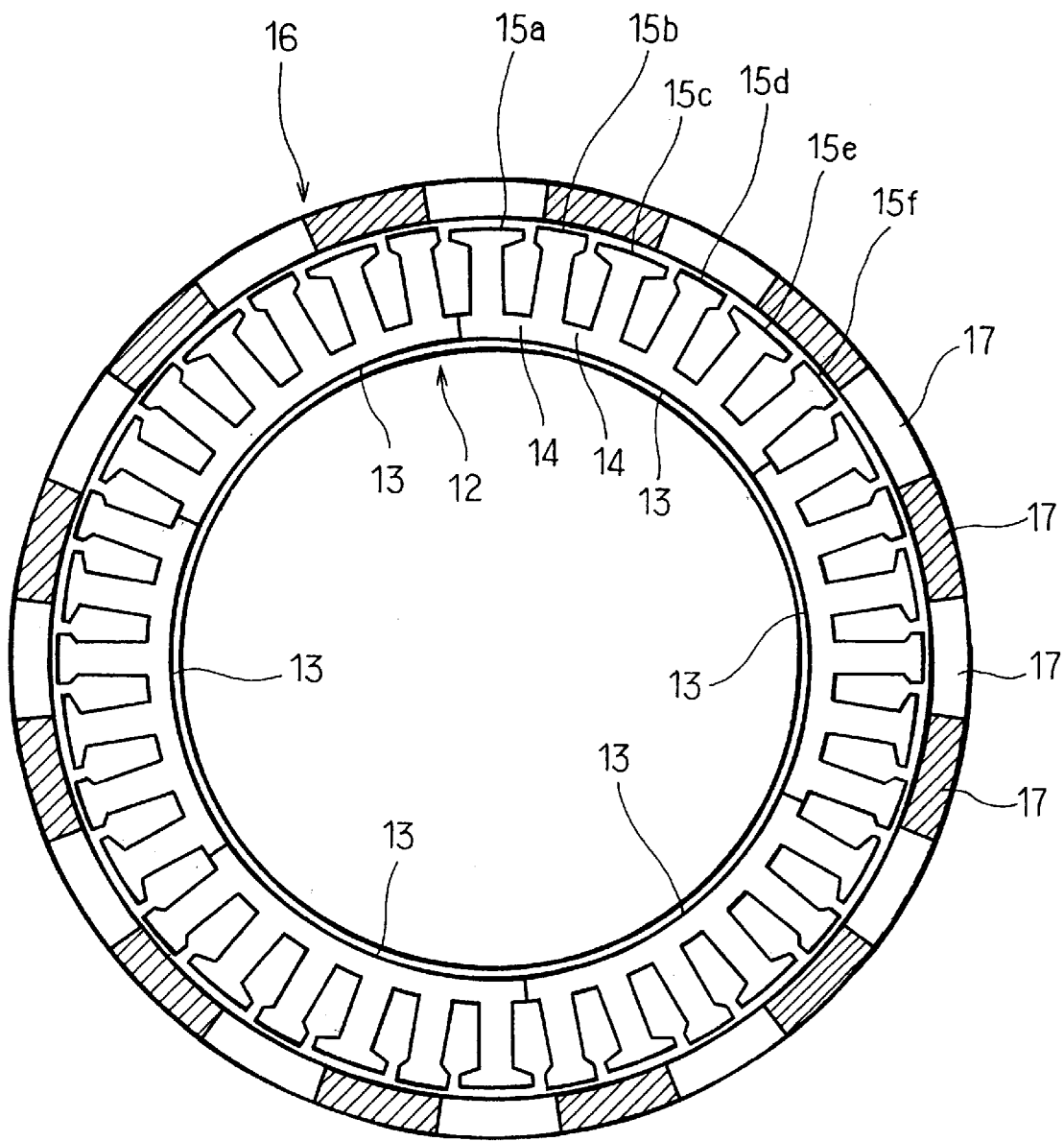
FIG. 3 is a plan view of an assembly of a rotor and stator core of an electric motor of a third embodiment in accordance with the invention.

FIG. 3 illustrates a third embodiment in which the invention is applied to a permanent magnet motor of the outer rotor type wherein a rotor is disposed outside a stator. A stator core 12 comprises six unit cores 13. Each unit core 13 is made by stacking a number of punched silicon steel sheets. Each unit core 13 includes a yoke section 14 and six salient poles 15a to 15f integrally extending from the yoke section. The unit cores 13 are embedded in a layer of a resin such as PPS resin by insert molding. Windings are wound an the salient poles 15a to 15f of each unit core 13 into a concentric winding (not shown) so that the salient poles 15a to 15f are in phase with those of the other unit cores 13 respectively. Further, two windings belong to the same phase two salient poles apart, that is, the windings on paired salient poles 15a and 15d belong to phase U. The windings on paired salient poles 15b and 15e belong to phase V and the windings on paired salient poles 15c and 15f belong to phase W. Thus, two sets of three-phase windings are wound on each unit core 13. The paired salient poles belonging to the same phase have different patterns of combination of a radius from the center of rotation to the distal end of the salient pole and a circumferential width of the distal end of the salient pole. In this case, each of the salient poles 15a, 15c and 15e has a smaller radius and a larger circumferential width, whereas each of the salient poles 15b, 15d and 15f has a larger radius and a smaller circumferential width. More specifically, there are two types of shapes of distal ends defined by the radius of the salient pole and the circumferential width of the distal end of the salient pole, and these two types are arranged alternately. Accordingly, when the arrangement of the two types of shapes of distal ends is one arrangement pattern, the number of salient poles in the arrangement pattern is 2 in each unit core 13. The number of winding phases 3 and the product or the number of salient poles and the number of winding phases is 6, which number agrees with the number of salient poles of each unit core 13.

A rotor 16 is provided outside the stator core 12. The rotor 16 comprises twenty-six permanent magnets 17 connected to one another. South pole magnets are shown by slant lines in FIG. 3, whereas no slant lines are given to north pole magnets. In this case, the number of magnetic poles can be divided by the number of unit cores since the number of unit cores 13 of the stator core 12 is 6 and the number of magnetic poles of the rotor 16 in 24.

Each adjacent portion of the unit cores 13 is located between the salient poles 15a and 15f and accordingly, the phase arrangement patterns of the windings at both sides of all the adjacent portions are the same. Further, the arrangement patterns of the shapes of distal ends of the salient poles at both sides of all the adjacent portions are also the same. As a result, amounts of magnetic flux passing through the respective adjacent portions are the same.

Although the phase arrangement patterns of the windings are the same with respect to the salient poles 15c and 15d, the arrangement pattern of the shapes of distal ends of the salient pole differs from that in the salient poles 15a and 15f.

Accordingly, no adjacent portion of the unit cores is provided between the salient poles 15c and 15d since a magnetic circuit with respect to the salient poles 15a and 15d differs from that with respect to the salient poles 15a and 15f such that amounts of magnetic flux are not the same.

According to the third embodiment, even when the distal ends of the salient poles 15a to 15f of the stator core 1 have different shapes in the permanent magnet motor of the outer rotor type, the stator core 12 has the portions where the amounts of magnetic flux are the same. Accordingly, the adjacent portions of the unit cores are set at the portions respectively such that occurrence of vibration and noise due to unbalance of the magnetic attractive forces between the unit cores can be prevented.

Effective use of a material for the iron core has recently been required in the development of motors with large diameters. Three-phase motors are mainly used and have a number of salient poles per phase. Further, a plurality of types of salient poles are arranged so as to be adjacent to each other as a countermeasure for the vibration. The number of salient poles in each arrangement pattern is often 2 which is the least natural number exceeding 1. In such a case, the largest number of unit cores can be obtained in the third embodiment when the iron core is split into unit cores each or which includes six salient poles, which number is the least common multiple to the number of energizing phases and the number of salient poles in each arrangement pattern.

Figure 4:
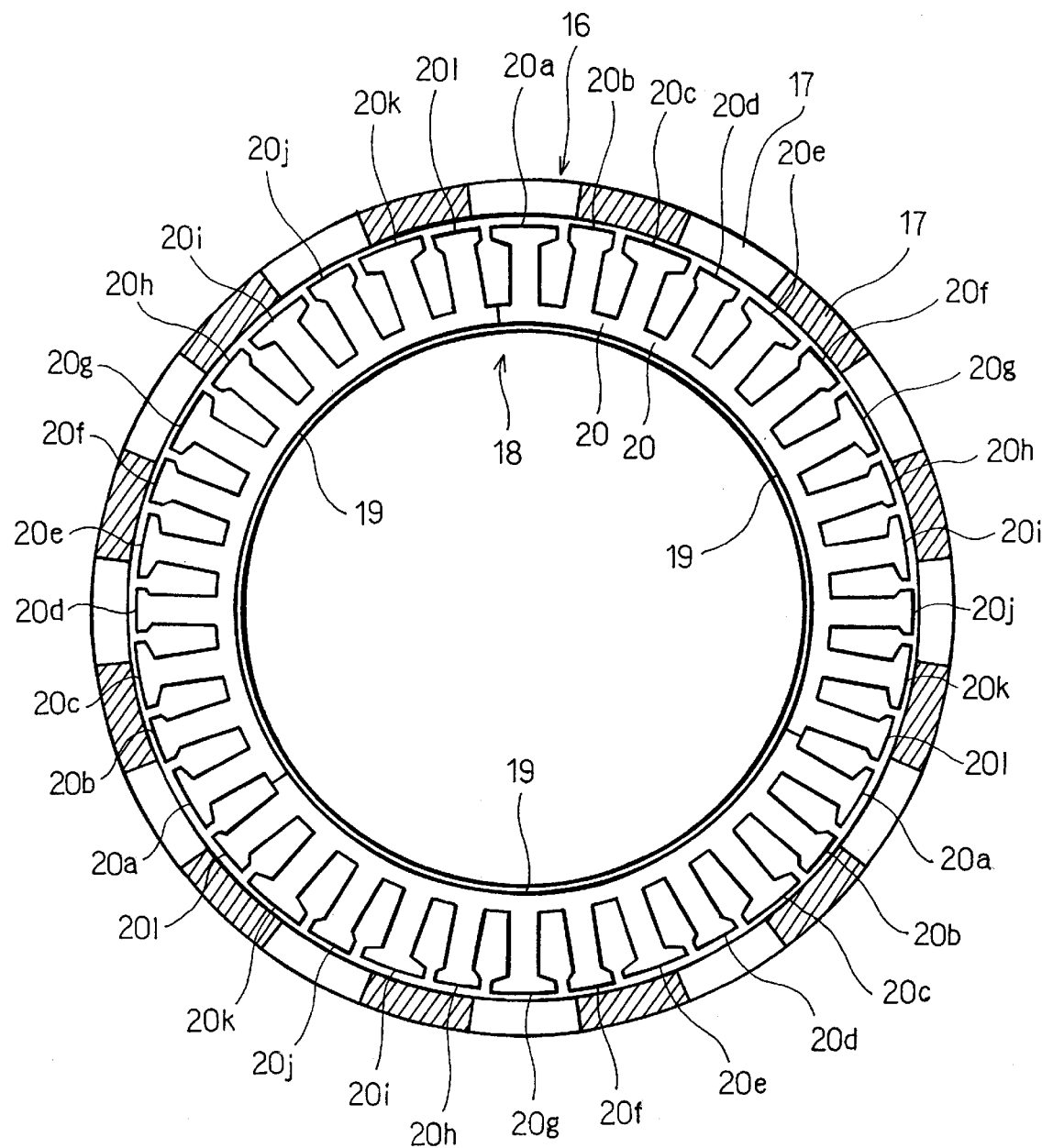
FIG. 4 is a view similar to FIG. 3, showing a modified form of the third embodiment.

FIG. 4 illustrates a modified form of the third embodiment shown in FIG. 3. A stator core 18 comprises three unit cores 19. Each unit core 19 includes a yoke section 20 and twelve salient poles 20a to 20l integrally extending from the yoke section. Windings are wound on the salient poles 20a to 20l of each unit core 19 into a concentric winding (not shown) so that the salient poles 20a to 20l are in phase with those of the other unit cores 19 respectively. Further, each one winding and the winding two salient poles apart belong to the same phase, that is, the windings on paired salient poles 20a and 20d belong to phase U. The windings on paired salient poles 20b and 20e belong to phase V and the windings on paired salient poles 20c and 20h belong to phase W, and so on. Thus, four sets of three-phase windings are wound on each unit core 19. The paired salient poles belonging to the sane phase have different patterns of combination of a radius from the center of rotation to the distal end of the salient pole and a circumferential width of the distal end of the salient pole. In this case, each of the salient poles 20a, 20e and 20i has a smaller radius and a larger circumferential width, whereas each of the salient poles 20b, 20f and 20j has a larger radius and a smaller circumferential width. Each of the salient poles 20c, 20g and 20k has a larger radius and a larger circumferential width. Each of the salient poles 20d, 20h and 20l has a smaller radius and a smaller circumferential width. More specifically, there are four types of shapes of distal ends defined by the radius of the salient pole and the circumferential width of the distal end of the salient pole, and the salient poles are arranged so that each one type is adjacent to another type. Accordingly, when the arrangement of the four types of shapes of distal ends is one arrangement pattern, the number of salient poles in the arrangement pattern is 4 in each unit core 13. The number of winding phases is 3 and the product of the number of salient poles and the number of winding phases in 12, which number agrees with the number of salient poles of each unit core 19. In this arrangement, too, the number of magnetic poles of the rotor 16 can be divided up by the number of unit cores.

Each adjacent portion of the unit cores 19 is located between the salient poles 20a and 20l and accordingly, the phase arrangement patterns of the windings at both sides of all the adjacent portion are the sane. Further, the arrangement patterns of the shapes of distal ends of the salient poles at both sides of all the adjacent portions are also the same. As a result, amounts of magnetic flux passing through the respective adjacent portions of the unit cores 19 are the same.

Although the phase arrangement patterns of the windings are the same with respect to the salient poles 20c and 20d, the salient poles 20f and 20g and the salient poles 20i and 20j, the arrangement pattern of the shapes of distal ends of the salient pole differs from that in the salient poles 20a and 20l. Accordingly, no adjacent portion of the unit cores is provided between each of the above-mentioned pairs of salient poles since amounts of magnetic flux are not the same.

Figure 5:
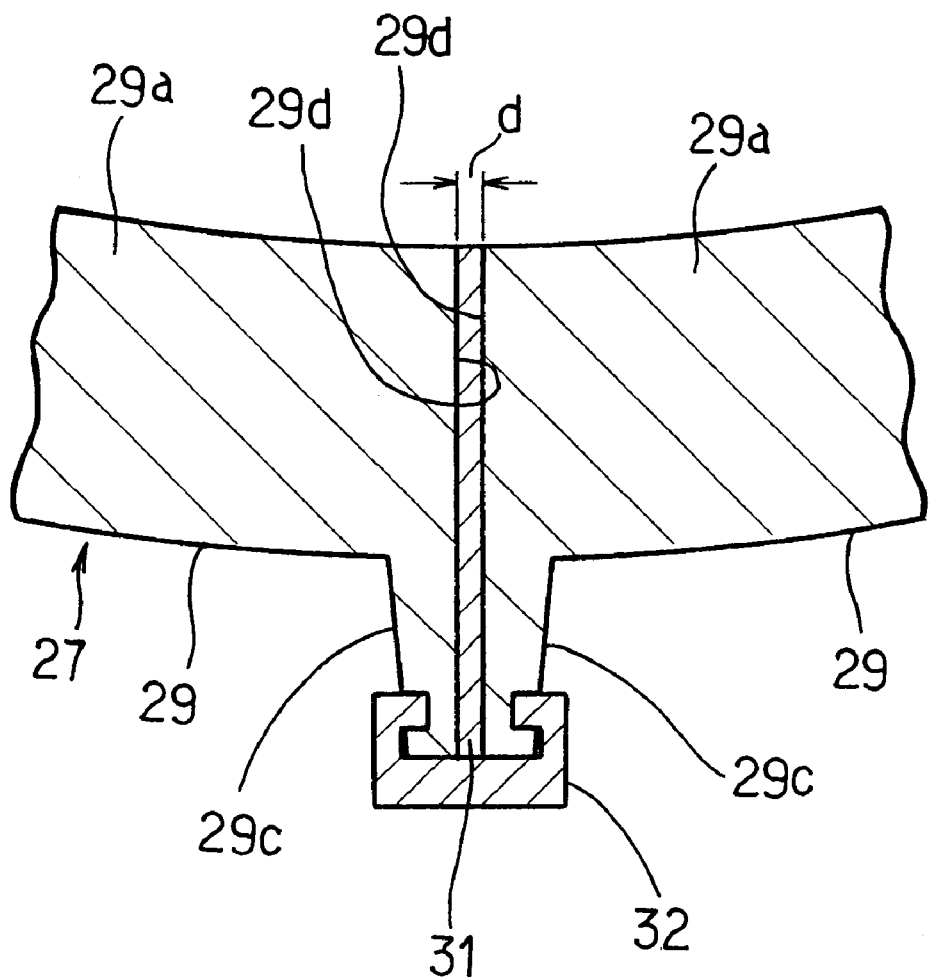
FIG. 5 is an enlarged transverse sectional plan view of connecting portions of unit cores in an electric motor of a fourth embodiment in accordance with the invention.
Figure 6:
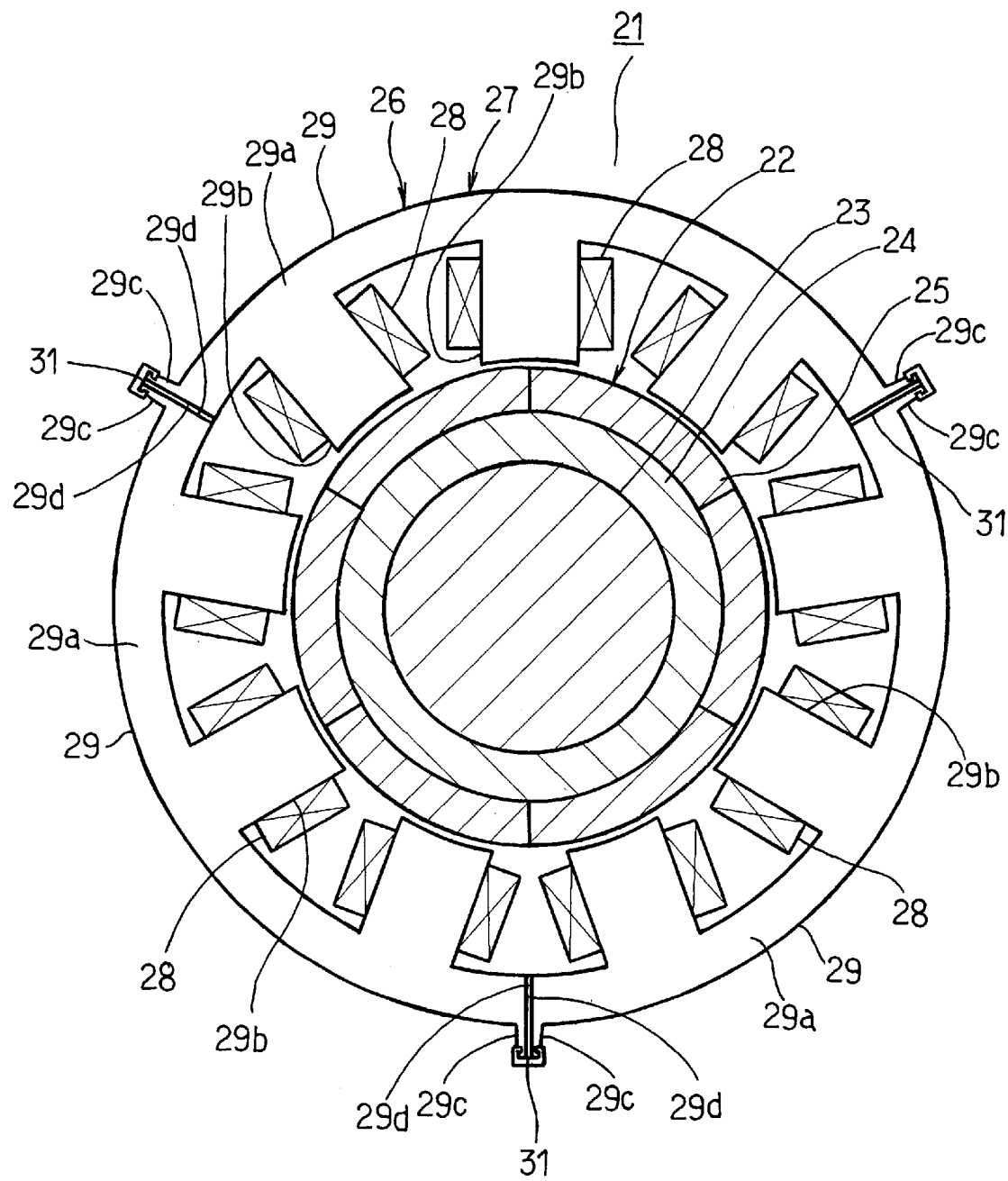
FIG. 6 is a plan view of the motor of the fourth embodiment.

FIGS. 5 to 8 illustrate a fourth embodiment of the invention. Referring to FIG. 6, a permanent magnet motor 21 of the inner rotor type is shown. A rotor 22 of the motor 21 includes a rotational shaft 23 to which a rotor yoke 24 is mounted. Permanent magnets 25 serving as magnetic field means are mounted on the rotor yoke 24. A stator 26 comprises a stator core 27 and salient poles 29b extending from the stator core. Windings 28 are wound on the salient pole 29b respectively. The rotor 22 and the stator 26 are assembled together so that the permanent magnets 25 and the windings 28 are radially opposed to each other respectively.

Figure 7:
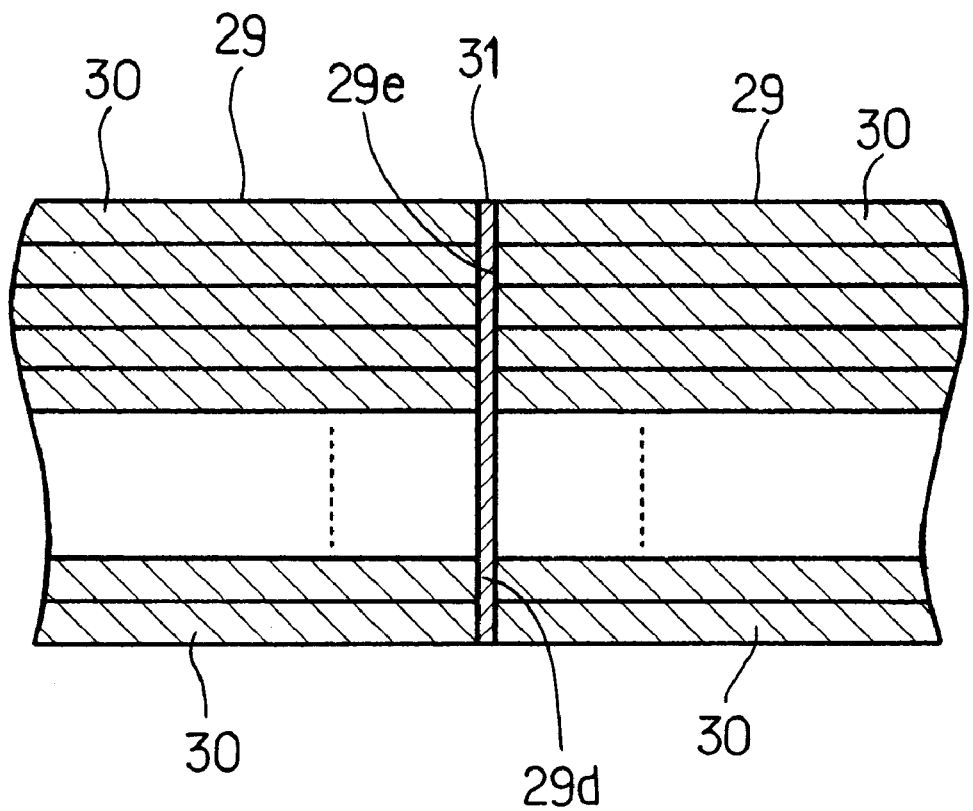
FIG. 7 is an enlarged longitudinal sectional plan view of the connecting portions of the motor shown in FIG. 6.

The stator care 27 includes three unit cores 29 connected to one another. Each unit core 29 is made by stacking a number of steel sheets 30 as shown in FIG. 7. Each steel sheet 30 is made by punching a silicon steel sheet having insulating films on an upper side and the backside thereof into a predetermined shape.

Each unit core 29 includes an arc-shaped yoke section 29a and salient poles 29b formed to protrude radially inwardly from the yoke section 29a. Each unit core 29 has two flat ends 29d. Each end 29d has a connecting protrusion 29c formed on the outer circumferential side thereof. The ends 29d of the unit cores 29 adjacent to each other are butted against each other by a clearance maintaining member 31, and the connecting protrusions 29c are connected together by a connecting member 32 as shown in FIG. 5, whereupon the unit cores 29 are connected to one another to thereby constitute the stator core 27. Each clearance maintaining member 31 is made of an electrically insulating film, for example, a polyester film, having a thickness of 0.1 mm. Accordingly, the iron loss is effectively reduced when a clearance between the ends 29d of the unit cores 29 adjacent to each other is set to be in a range between 0.01 and 0.15 mm.

According to the above-described embodiment, the electrically insulating clearance maintaining member 31 is provided between the unit cores 29 adjacent to each other. Consequently, since the unit cores 29 adjacent to each other are insulated from each other, the eddy current loss and accordingly the iron loss can be reduced. Particularly in the embodiment, the clearance between the unit cores 29 adjacent to each other in set to be in the range between 0.01 and 0.15 mm or more specifically at 0.1 mm. Consequently, an increase in the magnetic resistance can be restricted together with the reduction in the eddy current loss, so that the iron loss of the overall motor can be reduced. Further, since each clearance maintaining member 31 is made of the electrically insulating synthetic resin film, the reduction in the iron loss can be achieved by a relatively simpler construction.

Figure 9:
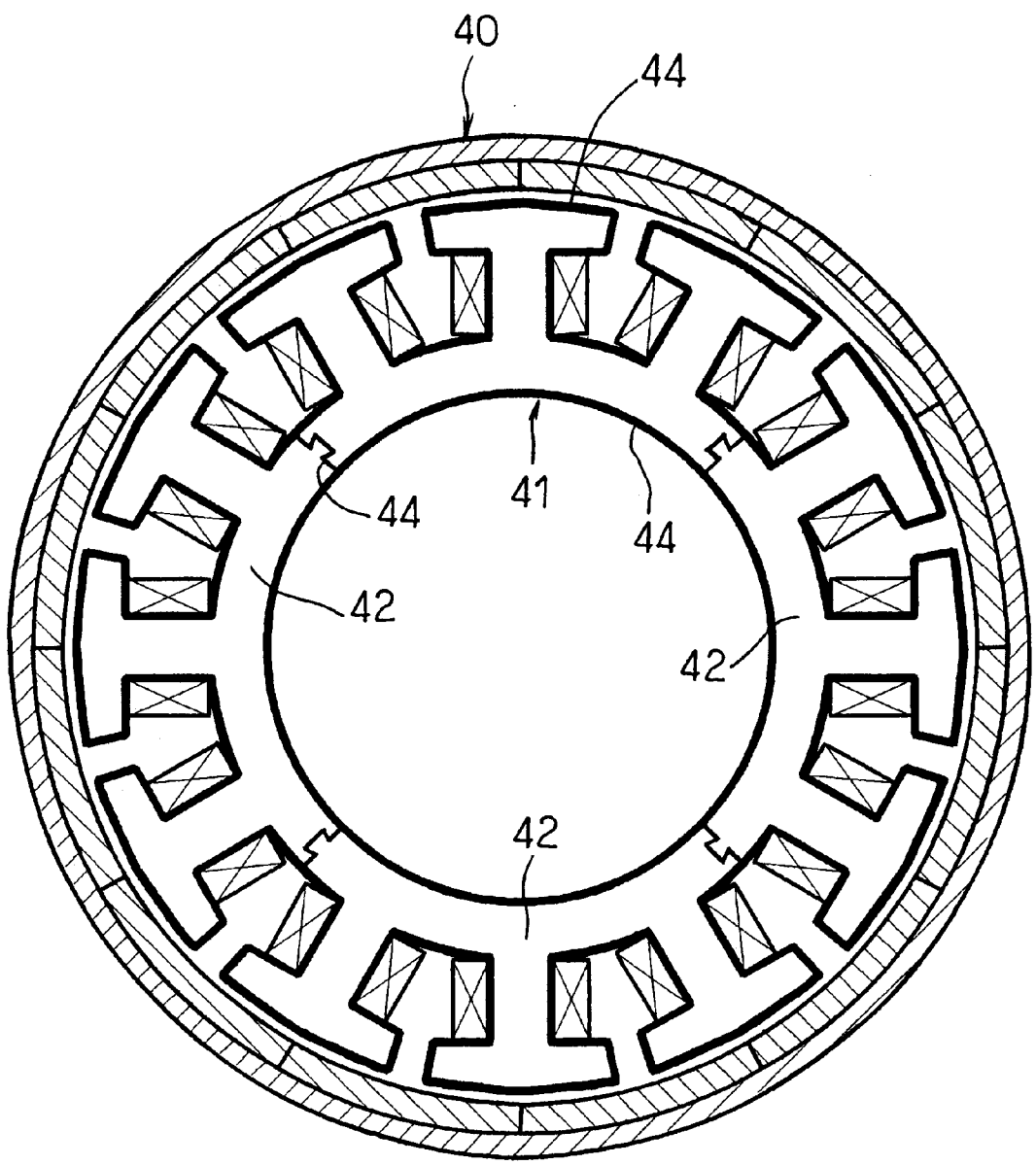
FIG. 9 is a transverse sectional plan view of an electric motor of a fifth embodiment in accordance with the invention.
Figure 10:
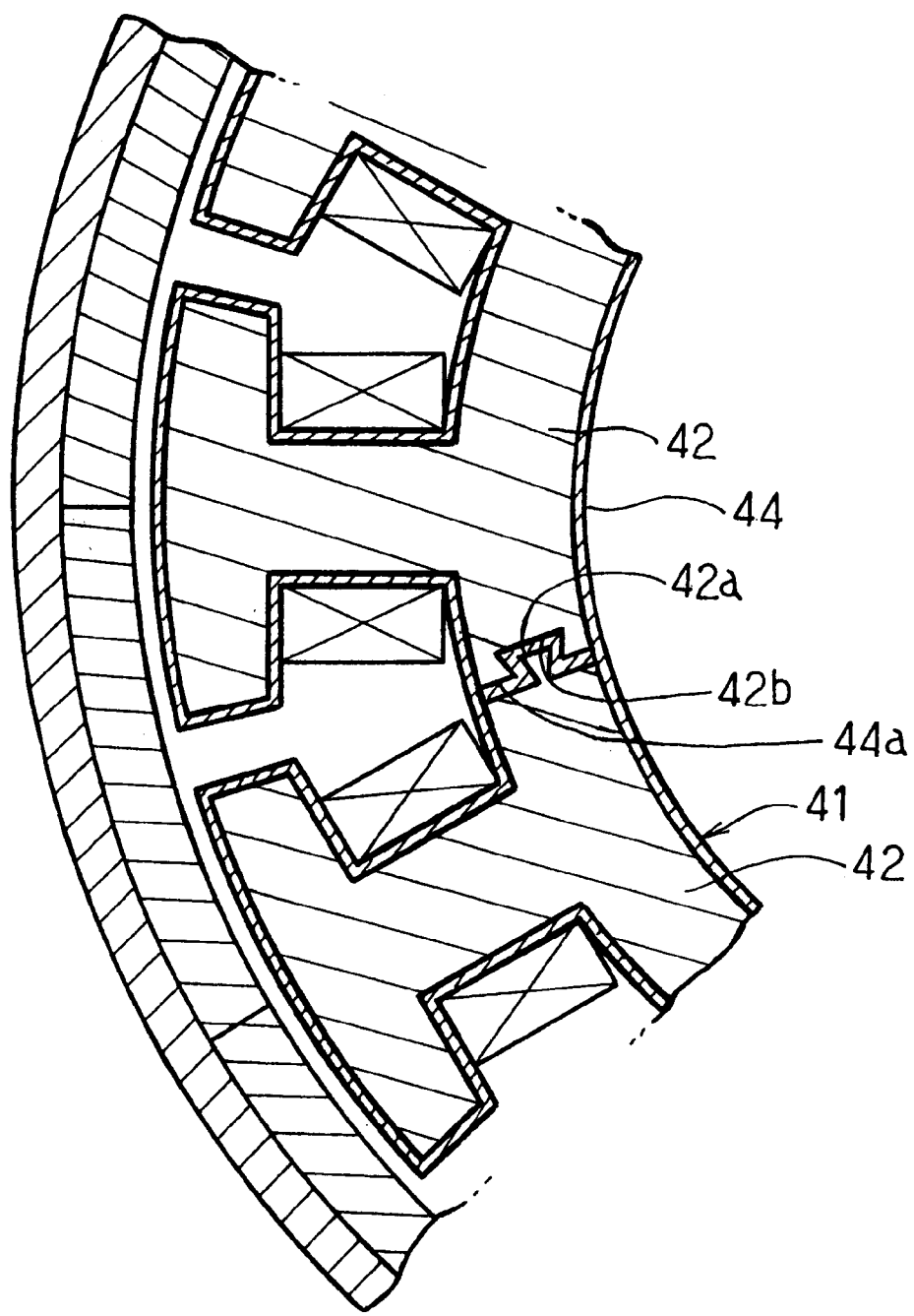
FIG. 10 is a partially enlarged transverse sectional plan view of the motor shown in FIG. 9.
Figure 11:
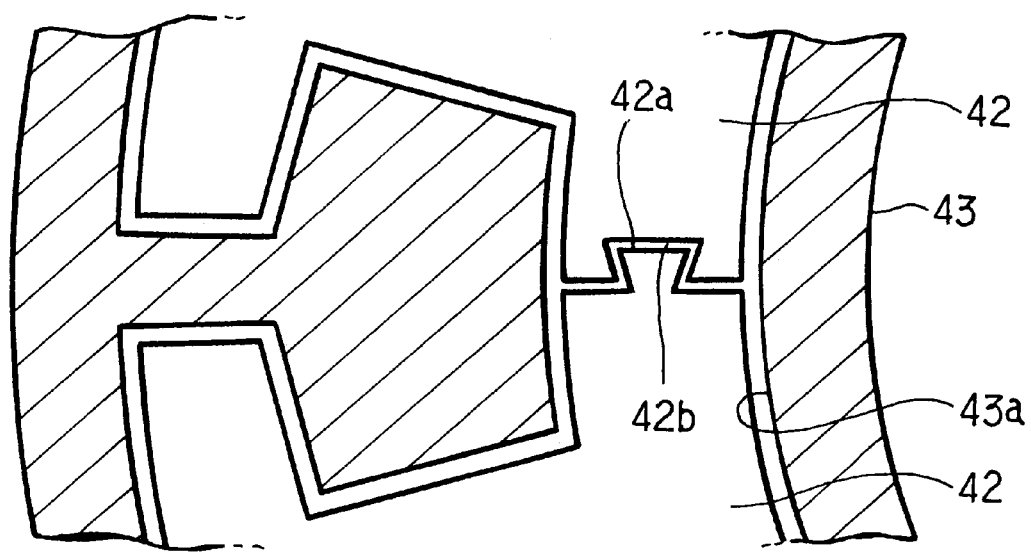
FIG. 11 is a transverse sectional plan view of a molding die, showing a method of making the motor shown in FIG. 9.

FIGS. 9 to 11 illustrate a fifth embodiment. The motor is of the outer rotor type in the fifth embodiment. The unit cores 42 are enclosed in a synthetic resin by an integral molding such that the unit cores are integrally connected to one another. A wedge-shaped convex portion 42a is formed on one of two ends of each unit core 42, whereas a wedge shaped concave portion 42b is formed in the other end of the each unit core 42.

In the manufacture of the above-described stator core 41, the unit cores 42 are disposed in a cavity 43a of a molding die 43 a part of which is shown in FIG. 11. At this time, the unit cores 42 are disposed so that the wedge-shaped convex and concave portions 42a and 42b of the unit cores 42 adjacent to each other are fitted with each other with a clearance ranging between 0.03 and 0.15 mm therebetween. A molten synthetic resin such as polyphenol sulfide or polyethylene terephthalate is injected into the molding die 43, so that the clearances are filled with the molten synthetic resin.

Thereafter, the synthetic resin is solidified such that an electrically insulating layer 44 is formed. The insulating layer 44 serves as the clearance maintaining members. Thus, in the fifth embodiment, a synthetic resin layer 44a is provided in the clearance between the unit cores 42 adjacent to each other as shown in FIG. 10 such that the insulating layer 44 serves as the clearance maintaining members. However, even when the synthetic resin layer 44a is not provided between the unit cores 42 adjacent to each other, the outer insulating layer 44 connects the unit cores 42 so that the unit cores 42 are immovable. Accordingly, the insulating layer 44 serves as the clearance maintaining members regardless of the presence of the synthetic resin layer 44a. The insulating layer 44 also serves as connecting means for connecting the unit cores 42 to one another. As a result, since the clearance maintaining members are also used as the connecting means, the number of components can be reduced.

Further, the clearance between the ends of the unit cores 42 adjacent to each other is set to be ranged between 0.01 and 0.15 mm in the embodiment. As a result, even when the injection pressure in not excessively increased during the injection molding, the molten synthetic resin desirably penetrates the clearance between the unit cores adjacent to each other. Consequently, the unit cores 42 adjacent to each other can reliably be maintained in a spaced-apart relation.

Figure 8:
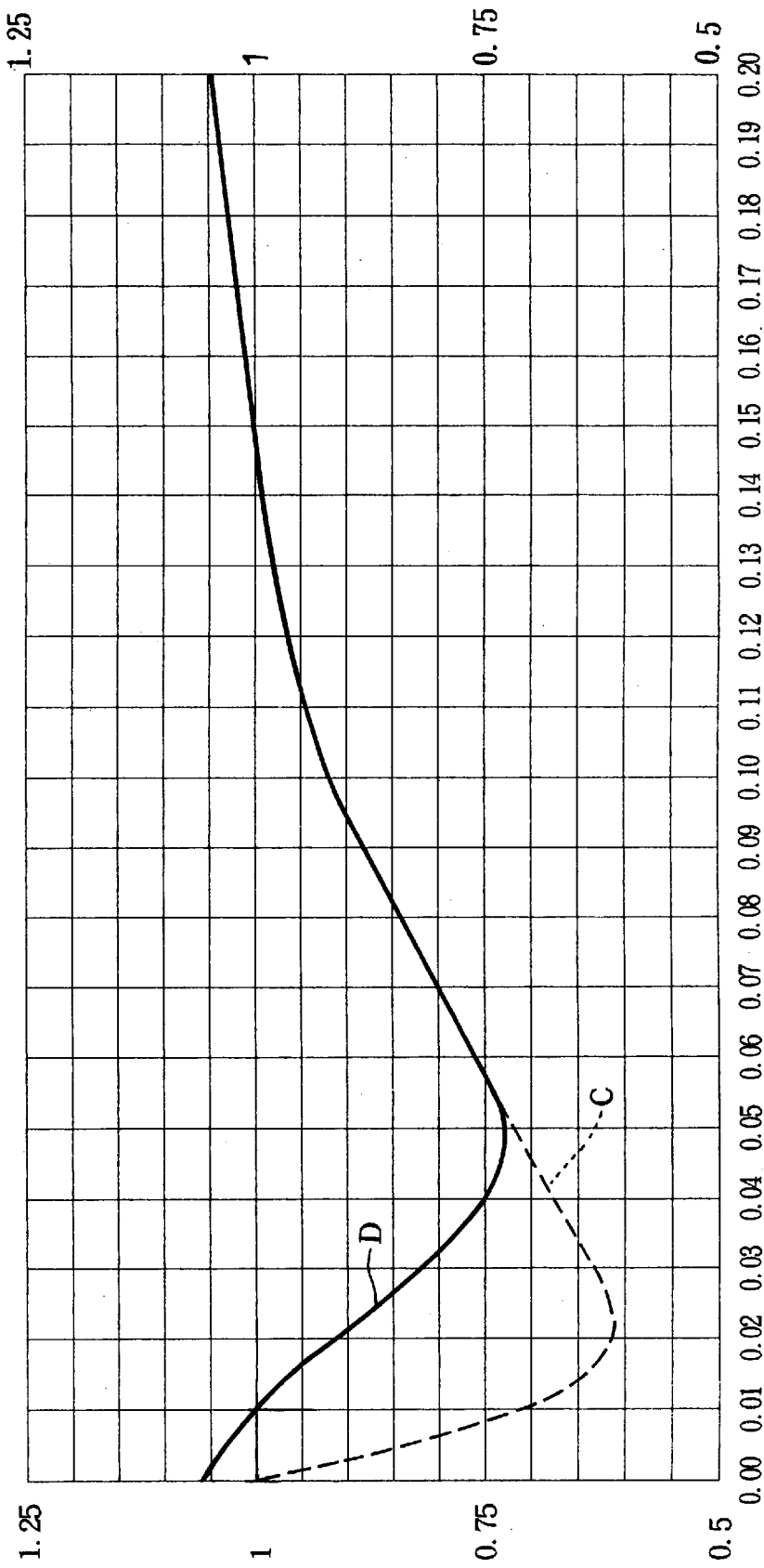
FIG. 8 is a graph showing the relationship between the clearance between the ends of the unit cores and the iron loss.

FIG. 8 shows the results of measurement of the iron loss by the inventors. Characteristic curve C shows the variations in the iron loss when the clearance between the ends of the unit cores adjacent to each other is changed from 0.01 to 0.200 mm in the case of a stator core in which cut ends of the steel sheets composing each unit core have no burrs and/or warpage due to the pressing and the unit cores adjacent to each other are not displaced in the direction of stacking of the steel sheets. Characteristic curve D shows the variations in the iron loss in the case of an actual product of stator core which unavoidably has minute burrs and/or warpage and an axial displacement of the unit cores.

An iron loss index TS is 1 when the clearance d between the ends of the unit cores is 0.00 mm, that is, when the ends of the steel sheets 20 are electrically conducted circumferentially but insulated axially. Concerning curve C, the iron loss decreases until the clearance d reaches 0.02 mm. Thereafter, the iron loss gradually increases. The magnetic resistance gradually increases when the clearance d exceeds 0.15 mm, so that the iron loss exceeds the index Ts.

Concerning curve D, the iron loss is at or above the index Ts until the clearance d reaches 0.01 mm. The reason for this would be that the ends of the unit cores adjacent to each other are in a slight contact with each other. The iron loss decreases when the clearance d is equal to or larger than about 0.01 mm. The curve D gradually increases as the curve C when the clearance d is 0.05 mm. When the clearance d exceeds 0.15 mm, the iron loss exceeds the index Ts.

FIGS. 12 to 15 illustrate a sixth embodiment of the invention. The ends 29d of each unit core 29 are heated by way of induction heating by heating means such as an induction heating apparatus 51 so that the temperatures of the ends 29d becomes equal to or larger than a predetermined value (which is larger than a melting point of powder of polyester system as will be described later), as shown in FIG. 13. The unit cores 29 are put into a chamber 52 in which the powders of polyester system are suspended in the air as shown in FIG. 14. As a result, the powders adhere to the ends 29d of the unit cores 29 to be melted into the shape of a thin film and solidified thereafter. Consequently, clearance maintaining members 53 are formed on the respective ends 29d of each unit core 29 as shown in FIG. 15. Each clearance maintaining member 53 has a thickness ranging between 0.01 and 0.15 mm. The unit cores 29 are connected to one another in the same manner as in the first embodiment. The clearance maintaining members 53 are interposed between the ends of the unit cores 29 adjacent to each other in the connected state of the unit cores. Consequently, the iron loss can be reduced in the sixth embodiment as in the fourth embodiment.

Particularly in the sixth embodiment, the clearance maintaining members 53 can be provided on only the portions requiring them (the ends of the unit cores 29), and thin clearance maintaining members can easily be formed, whereupon the manufacturing efficiency can be improved. Although one of the ends of each unit core 29 is formed with the clearance maintaining member 53, both ends of each unit core 29 may be formed with the respective clearance maintaining members 53, instead. In this case, two layers of the clearance maintaining member 53 are interposed between the ends of the unit cores 29 adjacent to each other in the connected state of the unit cores. Accordingly, the thickness of each one clearance maintaining member 53 is set to range between 0.005 and 0.075 mm. In other words, a total thickness of the clearance maintaining members 53 interposed between the ends or the unit cores 29 is set so that the clearance between the ends of the unit cores 29 ranges between 0.01 and 0.15 mm.

Figure 16:
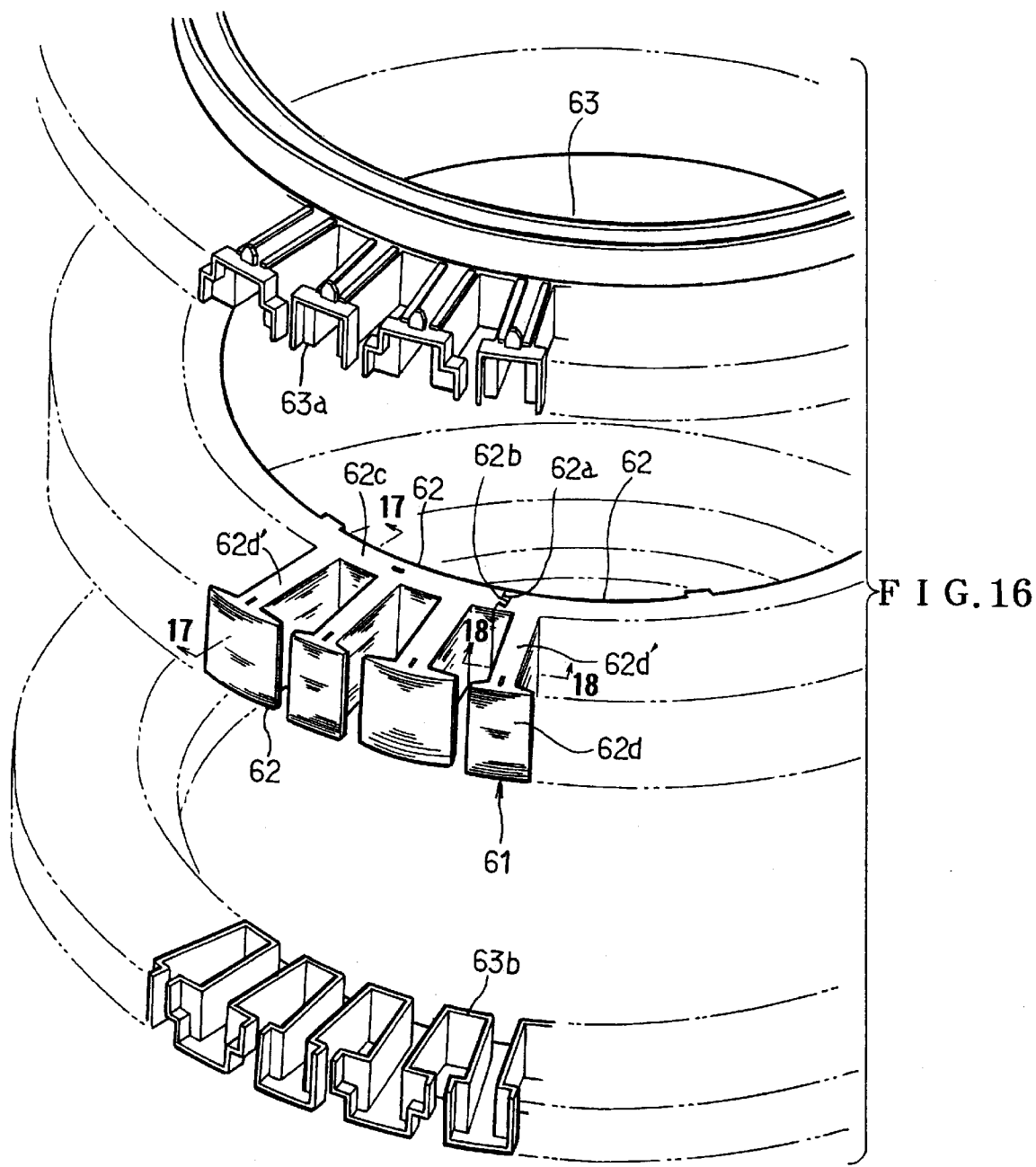
FIG. 16 is an exploded perspective view of the stator and holding frames employed in the motor of the fourth embodiment.
Figure 17:
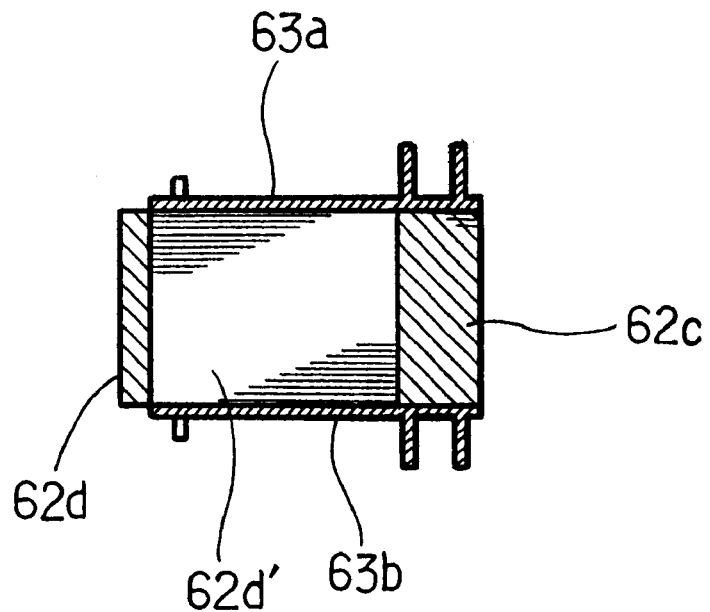
FIG. 17 is a sectional view taken along line 17—17 in FIG. 16.
Figure 18:
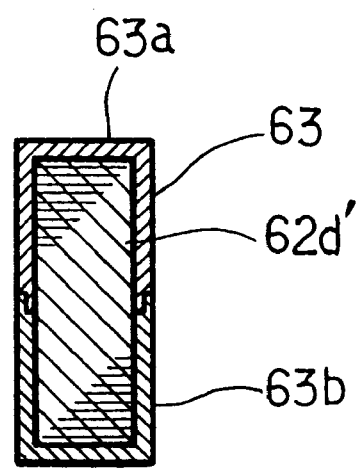
FIG. 18 is a sectional view taken along line 18—18 in FIG. 16.

FIGS. 16 to 18 illustrate a seventh embodiment. A stator core 61 shown in FIG. 16 is of a multiple slot type and also has a large number of unit cores 62. Both ends of each unit core 62 are formed with the wedge-shaped convex and concave portions 62a and 62b respectively. A pair of holding frames 63 have a number of fitting sections 63a and 63b made of an electrically insulating material such as polyester, respectively. The unit cores 62 are held in the connected state by the holding frames 63. More specifically, the fitting sections 63a and 63b are formed so that the yoke section 62c and the base 62d of each unit core 62 can be fitted into them. The fitting sections 63a and 63b are fitted into the unit cores 62 so as to hold them in a state where the ends of the unit cores adjacent to each other are engaged with each other, respectively, so that the unit cores 62 are connected together so as to be immovable. The clearance between the wedge-shaped convex and concave portions 62a and 62b is set to range between 0.01 and 0.15 mm.

The number of components can be reduced in the sixth embodiment since the holding frames 63 serves as the clearance maintaining members and also as the connecting means.

The electrically insulating material used in the foregoing embodiments should not be limited to polyester, polyphenol sulfide or polyethylene terephthalate.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. An electric motor comprising:

a rotor; and a stator including a plurality of unit cores each of which has two ends, the unit cores being disposed so that the ends of each unit core are adjacent to the ends of the neighboring unit cores respectively, each unit core including a yoke section and a plurality of salient poles which are integral with the yoke section and on which windings are wound, wherein each unit core includes the salient poles the number of which is represented as CM(NT/CD(Nt, Np), Nf) where CM(A, B) is a common multiple of integers A and B, CD(A, B) is a common divisor of integers A and B, Nt is a total number of salient poles of the stator, which is equal to or larger than 2, Np is a total number of magnetic poles of the rotor, which is equal to or larger than 2, and Nf is the number of winding phases.

2. An electric motor comprising:

a rotor; and a stator including a plurality of unit cores each of which has two ends, the unit cores being disposed so that the ends of each unit core are adjacent to the ends of the neighboring unit cores respectively, each unit core including a yoke section and a plurality of salient poles which are integral with the yoke section and on which concentrated windings are wound, wherein:

each unit core is disposed so that the yoke section thereof is adjacent to the yoke sections of the neighboring unit cores and so that the salient poles thereof are separate from the salient poles of the neighboring unit cores:

the salient poles are arranged circumferentially with a regular pitch;

a number of the salient poles of each unit core is equal to a number of phases of the windings multiplied by any integer; and each of the portions of the unit cores adjacent to each other is set to assume an angular position where a multiple obtained by multiplying a pitch angle of the salient poles agrees with a multiple obtained by multiplying a pitch angle of magnetic poles of the rotor.

3. An electric motor comprising:

a rotor; and a stator including a plurality of unit cores each of which has two ends, the unit cores being disposed so that the ends of each unit core are adjacent to the ends of the neighboring unit cores respectively, each unit core including a yoke section and a plurality of salient poles which are integral with the yoke section and on which concentrated windings are wound, wherein:

each unit core is disposed so that the yoke section thereof is adjacent to the yoke sections of the neighboring unit cores and so that the salient poles thereof are separate from the salient poles of the neighboring unit cores:

the salient poles are arranged circumferentially with a regular pitch;

a number of the salient poles of each unit core is equal to a number of phases of the windings multiplied by any integer; and the salient poles have different shapes of distal ends and arranged in a pattern in which said salient poles having the different shapes of distal ends adjoin each other, the pattern being repeated circumferentially; and the number of the salient poles of each unit core is equal to a common multiple to a number of the distal end shapes of the salient poles and the number of winding phases.

4. The motor according to claim 3, wherein the number of the salient poles is equal to a least common multiple to a number of the distal end shapes of the salient poles and a total number of winding phases.

5. The motor according to claim 3 or 4, wherein a plurality of salient poles constituting the pattern have different lengths from the center of rotation of the rotor to respective distal end thereof.

6. The motor according to claim 5, wherein the number of winding phases is three, the number of the distal ends of the salient poles is two, and each unit core includes six salient poles.

7. The motor according to claim 3 or 4, wherein a plurality of salient poles constituting the pattern have distal ends with different widths respectively.

8. The motor according to claim 7, wherein the number of winding phases is three, the number of the distal ends of the salient poles is two, and each unit core includes six salient poles.

9. The motor according to claim 4, wherein the number of winding phases is three, the number of the distal ends of the salient poles is two, and each unit core includes six salient poles.

10. An electric motor comprising:

a rotor; and a stator including a plurality of unit cores each of which has two ends, the unit cores being disposed so that the ends of each unit core are adjacent to the ends of the neighboring unit cores respectively, each unit core including a yoke section and a plurality of salient poles which are integral with the yoke section and on which concentrated windings are wound, wherein:

each unit core is disposed so that the yoke section thereof is adjacent to the yoke sections of the neighboring unit cores and so that the salient poles thereof are separate from the salient poles of the neighboring unit cores:

the salient poles are arranged circumferentially with a regular pitch;

a number of the salient poles of each unit core is equal to a number of phases of the windings multiplied by any integer; and the salient poles include a plurality of salient poles having different radii between the center of rotation of the rotor and having a distal end of each salient pole.

11. An electric motor comprising:

a rotor; and a stator including a plurality of unit cores, each of which has two ends, the unit cores being disposed so that the ends of the unit cores are adjacent to the ends of the neighboring unit cores with electrically insulating clearance maintaining members being interposed therebetween, respectively, each unit being formed by stacking a number of steel sheets each of which has a surface to which a treatment for electrical insulation is applied, each clearance maintaining member being made of an electrically insulating film of synthetic resin differing from the steel sheets of each unit core to which the treatment for electrical insulation is applied.

12. The motor according to claim 11, wherein each clearance between the ends of each unit core and the neighboring unit cores is set to be in a range between 0.01 and 0.15 mm.

* * * * *